Figures 1, 2:
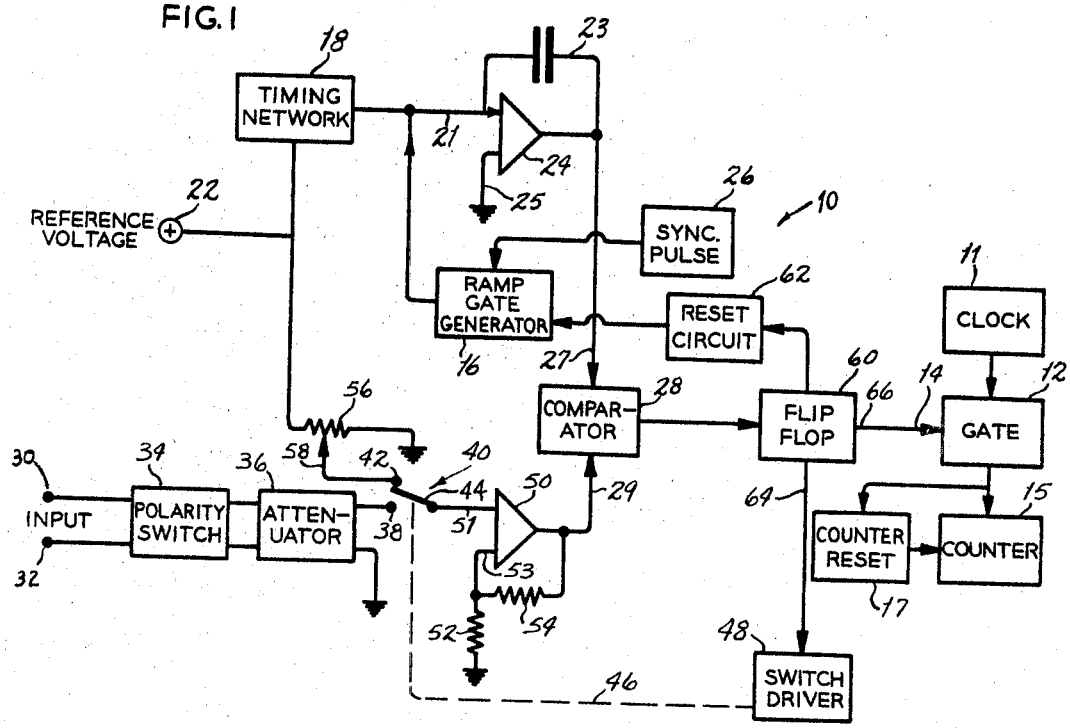

April 1, 1969  R. G. MYERS ET AL  3,436,756
VOLTAGE TO TIME-INTERVAL CONVERTER
Filed Dec. 30, 1965  Sheet 1 of 2

INVENTORS
RONALD G. MYERS, SAMUEL C. REID
AND DAVID M. BARTON
ATTORNEY

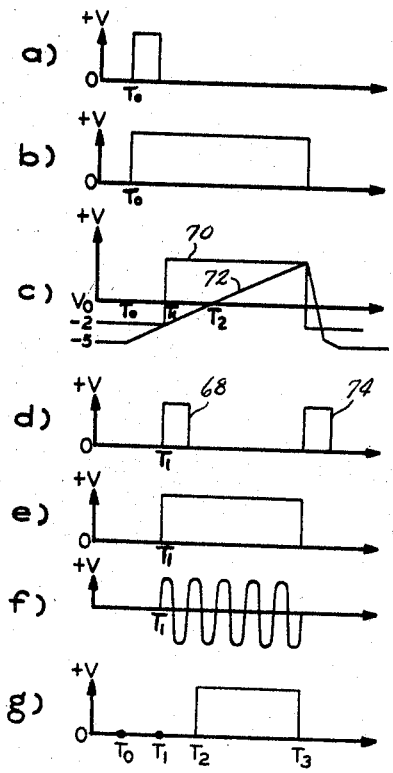
FIG. 3
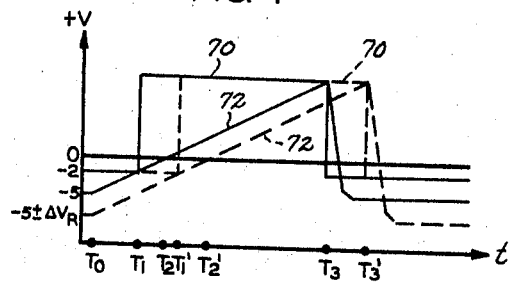
FIG. 4
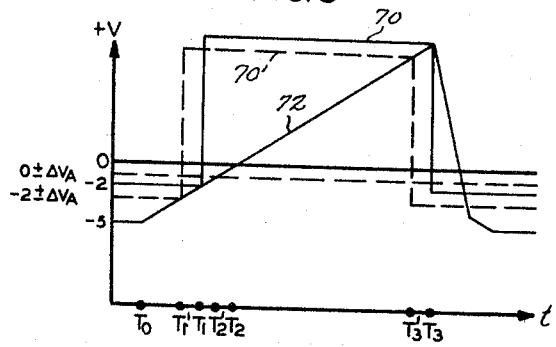
FIG. 5
INVENTORS
RONALD G. MYERS, SAMUEL C. REID
AND DAVID M. BARTON
BY 
ATTORNEY

United States Patent Office 3,436,756
Patented Apr. 1, 1969

3,436,756
VOLTAGE TO TIME-INTERVAL CONVERTER
Ronald G. Myers, Bridgeton, Samuel C. Reid, St. Louis, and David M. Barton, Bridgeton, Mo., assignors to Monsanto Company, St. Louis, Mo., a corporation of Delaware
Filed Dec. 30, 1965, Ser. No. 517,568
Int. Cl. H03k 13/02; H04l 3/00
U.S. Cl. 340—347    5 Claims The present invention relates generally to a solid state electronic measuring circuit for converting an unknown or known analog voltage into a precise time interval which is proportional to such voltage. More particularly, this invention pertains to electronic circuitry comprised of semi-conductor devices for use in a precision instrument; for example, a digital voltmeter, wherein the precision of the instrument is substantially unaffected by such factors as voltage drift of various functional units.

Voltage to time-interval converters of various types have been proposed. One type which has met with varying degrees of success is one which uses what is commonly referred to as the "ramp technique." A voltage which varies linearly with respect to time is generated and compared to the voltage to be measured and a fixed reference voltage. The time interval which elapses between the coincidence of the analog and reference voltages with the linear "ramp" voltage is used to gate a high speed clock, whose pulse output during the established time interval may be counted to yield a digital indication of the analog voltage.

Heretofore, it has been the general practice either to (1) treat the analog and reference signals in separate channels with different functional units (i.e. amplifiers and/or comparators in separate channels which converge at the clock gate) or (2) provide a highly-stable, expensive amplifier (i.e. a chopper-stabilized amplifier) to which both the analog and reference signals are selectively applied. In the former situation, in addition to the fact that a duplication of devices is required, drift due to temperature variations, mismatching of the functional units, etc. introduces intolerable inaccuracies. In the latter situation the cost of the instrument becomes a limiting factor.

The general purpose of this invention is to provide a voltage to time-interval converter which embraces the advantages of similarly employed electronic converters, but which does not possess the aforedescribed disadvantages. To attain this, the present invention utilizes a unique combination of a dual voltage comparison technique and a D.C. scaling amplifier whose input is switched between the analog input voltage and an offset reference voltage.

An object of the present invention is the provision of a novel solid state electronic voltage to time-interval converter which assures that voltage drift or offset of functional units thereof does not substantially affect the desired precision of the instrument.

Another object is to provide a voltage to time-interval converter which avoids the use of highly-stable, costly amplifiers without sacrificing the accuracies in measurements performed thereby.

A further object of the invention is the provision of a solid state voltage to time interval converter having an accuracy of .01% at 25° C. and a temperature coefficient of approximately .002%/° C. for deviations from 25° C.

Utilization of the invention will become apparent to those skilled in the art from the disclosures made in the following description of a preferred embodiment of the invention, as illustrated in the accompanying drawings, in which:

FIG. 1 is a block diagram representation of the electronic functional units comprising a preferred embodiment of the present invention, FIG. 2 is a graphical representation of nominal wave forms obtained at various points in the circuit of FIG. 1 under idealized conditions;

FIG. 3 is a graphical representation similar to FIG. 2 and illustrating the difference between idealized wave forms and those obtained because of finite switching speeds, and FIGS. 4 and 5 are graphical representations of typical wave forms obtained at the input of the comparator of FIG. 1 and illustrating the ability of the present invention to substantially eliminate the influence of voltage drift of certain functional units.

Referring now to the drawings, wherein like reference characters designate like or corresponding parts throughout the several views, there is shown in FIG. 1 a solid state electronic voltage to time-interval converter circuit, generally designated 10. The converter circuit 10 includes a high-speed, free-running clock 11 which generates uniformly spaced pulses at its output. In order to obtain digital time-interval measurements with a high degree of precision, it has been found preferable to employ a clock 11 capable of generating uniformly spaced pulses at the rate of 10 million cycles per second. Obviously pulses having a lower frequency may be obtained by the insertion of a conventional divider network or the like. The output of the clock 11 is fed to a conventional clock gate 12 which may be opened and closed by applying start and stop pulses respectively to its gating input 14. For example, a transistor may be employed as the gate 12; its base serving as the control electrode and its collector-emitter path serving to pass the generated pulses.

The output of the clock gate 12 is fed to a high speed counter 15 which may take the form of a plurality of cascaded bi-quinary decade counters as disclosed in application Ser. No. 440,830 filed Mar. 18, 1965 by George E. Smith. A counter reset circuit 17 is also connected between the gate 12 and the counter 15 for purposes to be described hereinafter. It should be understood that the counter 15 may be connected to a storage unit which in turn may be connected to a digital display device such as an array of neon lights or "Nixie" tubes. For purposes of illustration however, these additional conventional units are not shown.

The voltage to time-interval converter 10 includes solid-stage circuit means for internally generating a linear sweep voltage as a function of time. The linear sweep voltage is referred to herein as a "ramp" voltage, such as is obtained by a conventional integrating circuit. This ramp voltage generating means includes a synchronizing pulse generator 26, a ramp gate generator 16, a timing network 18, a reference potential source 22, and an integrating operational amplifier 24.

The synchronizing pulse generator 26 is connected as one input to the ramp gate generator 16, which may take the form of a solid state switch or other device having two stable states of operation. The output of ramp gate generator 16 is connected to one input terminal 21 of the integrating operational amplifier 24, whose output is also applied to terminal 21 by means of a feed-back capacitor 23. The other input 25 of the integrating operational amplifier 24 is grounded. Also connected to the input terminal 21 of the integrating operational amplifier 24 is the output of the timing network 18, which in turn is coupled to a highly stable voltage source 22, for example a reference diode. The timing network 18 may be a group of resistors selectable individually or in combination to change the charging characteristic of the feed-back capacitor 23.

The output of the integrating operational amplifier 24 is connected to one input 27 of a voltage comparator circuit 28. The voltage comparator circuit 28 may take any one of various forms, but it is preferably a transistorized linear sweep pick-off circuit. It serves to provide an output pulse when its inputs are equal or obtain some predetermined value with respect to each other.

The input terminals 30 and 32 of the converter circuit 10 receive the analog voltage which is to be converted into a precise time interval. The analog voltage is generated externally; for example, in a process control circuit the analog voltage may be generated to any one of numerous pneumatic, magnetic or other similar sensors. The input terminals 30, 32 are connected to an appropriate polarity switching circuit 34, which in turn is connected to attenuating circuitry, designated 36 in FIG. 1. Although the switching circuitry 34 and attenuating circuitry 36 form no part of the present invention, they are desirable in a precision instrument to condition the analog input signal so that it is of the proper algebraic sign and normalized when applied to the D.C. scaling amplifier, to be described hereinafter. The output of the attenuating circuitry 36 is connected to a contact 38 of a high-speed mechanical switch, generally designated 40. The switch 40 is a double-pole, single-throw switch consisting of two contacts 38, 42 and a contact arm 44. As indicated by the dashed line 46, the switch 40 is coupled to a switch driver 48, to be more fully described hereinafter.

The contact arm 44 of the switch 40 is connected to one input terminal 51 of a non-inverting D.C. amplifier 50, commonly referred to as a scaling amplifier. Preferably the amplifier 50 consists of conventionally cascaded differential amplifiers having transistor or other semiconductor components. The input terminal 53 of the scaling amplifier 50 serves as a feedback terminal and is connected to appropriate biasing and feedback resistors 52 and 54. The output terminal of the scaling amplifier 50 is connected to a second input terminal 29 of the voltage comparator circuit 28. The scaling amplifier 50 is a high gain D.C. amplifier characterized by a high input impedance and a low output impedance. It accepts the signal applied to its input 51 by the contact arm 44 of the switch 40 and delivers an amplified D.C. signal having an appropriate level to drive the voltage comparator circuitry 28 without unduly loading it.

Circuit means are also provided for internally generating a reference voltage which is to be selectively applied to the input of the D.C. scaling amplifier 50. Such means consists of a potentiometer 56 which is connected between the highly stable reference diode 22 and ground potential. A variable tap 58 of the potentiometer 56 is connected to the contact 42 of the switch 40. By means of the variable tap 58 a calibrated reference voltage may be selectively applied to and amplified by the D.C. scaling amplifier 50.

The output of the voltage comparator circuitry 28 is coupled to a conventional flip-flop circuit 60. The output of the flip-flop circuit 60 is connected to the switch driver circuit 48, the clock gate 12, and a threshold reset circuit 62. The reset signal from circuit 62 is connected to the ramp gate generator 16 to return it to its initial state of operation as will be further described hereinafter.

The ideal or nominal operation of the voltage to time-interval converter circuit 10 is illustrated by the wave forms of FIG. 2. A start pulse as indicated in FIG. 2a is generated at a time $T_0$ by the synchronizing pulse generator 26 and applied to the ramp gate generator 16. The start pulse triggers the ramp gate generator 16 from its low-voltage state of operation to its high-voltage state of operation, as indicated in FIG. 2b. The integrating operational amplifier 24, whose output is initially clamped to a voltage slightly less than the reference potential $V_0$ as indicated in FIG. 2c is actuated by the ramp gate generator 16 switching to its high-voltage state of operation. The output of the integrating operational amplifier 24 is applied to the input 27 of comparator 28.

Initially the switch 40 is in the position shown in FIG. 1 so that the reference potential of magnitude $V_0$ appears at the output of the scaling amplifier 50, that is, it is applied to the input 29 of the comparator circuit 28. The ramp voltage 72 of FIG. 2c begins to increase linearly at time $T_0$ and at time $T_1$ reaches the value of the reference potential $V_0$. Since the input signals to the comparator circuit 28 are of equal magnitude at time $T_1$, it will generate a start pulse 68 at its output as shown in FIG. 2d. The start pulse 68 is applied to the flip-flop circuit 60 which changes state in the conventional manner and triggers the switch driver circuit 48. The switch driver circuit 48 then actuates the switch 40 to switch the contact arm 44 from the contact 42 to the contact 38.

The switching of the flip-flop circuit 60 also energizes the clock gate 12 as indicated in FIG. 2e so that the clock pulses are applied to the counter 15 as indicated in FIG. 2f.

When the scaling amplifier input has been switched to the contact 38 of switch 40, the analog input voltage appearing at input terminals 30, 32 is amplified, and applied to the input 29 of the comparator 28, as indicated by the step pulse 70 in FIG. 2c. It should be noted that the ramp signal 72 continues to increase linearly in magnitude from its initial value at time $T_0$ until it reaches the magnitude of the step wave form 70. When this happens, the comparator again senses that the two inputs to it are equal and generates a stop pulse 74 which is applied to the flip-flop 60 to return it to its initial condition. Upon flip-flop 60 returning to its initial condition, the clock gate 12 closes and inhibits the passage of the clock pulses from the clock 11 to the counter 15. At this time the indication provided by the counter 15 is proportional to the time interval delimited by the start and stop pulses 68 and 74; that is the counter 15 provides a digital indication corresponding to the analog input voltage which was applied to the input terminals 30, 32.

When the flip-flop 60 is returned to its initial condition by the stop pulse 74, the switch driver circuit 48 returns the contact arm of the switch 40 to the contact 38 so that the converter circuit 10 is reset for a second measuring interval. The integrtaing operational amplifier 24 is simultaneously reset by the application of the stop pulse to the threshold reset circuit 62, which in turn returns the amplifier output ot its clamped low voltage value at time $T_0$.

Although the nominal or idealized operation, just described, illustrates the basic operation of the circuitry, it does not depict the actualities of circuit conditions which adversely affect the accuracy of a high precision instrument. To illustrate one source of error, consider the finite delay or time interval required between the time the comparator 28 produces its first output pulse 68 and the time that the input to the scaling amplifier 50 is switched to receive the analog input voltage. For example, consider that a delay of approximately 2 milliseconds is required before the scaling amplifier 50 is fully switched. Since the integrating operational amplifier 24 is running during this 2 millisecond time interval, the counter 15 is supplied with pulses from the clock 10. It is necessary to compensate for these pulses supplied during the 2 millisecond time-delay interval.

In the present invention this compensation is achieved by making the first voltage coincidence of the ramp voltage 72 and the reference voltage 70 occur before the ramp voltage 72 crosses the zero reference $V_0$, see FIG. 3c.

Initially the scaling amplifier input 51 is connected by the switch 40 to the tap 58 of the potentiometer 56. The potentiometer 56 is set such that the reference voltage 70 appearing at the output of the scaling amplifier 50 is of slightly negative value with respect to the reference potential $V_0$. Similarly the integrating operational amplifier 24 is adjusted by means of the ramp gate generator 16 so that its output begins to rise from a even more negative value as indicated in FIG. 3c. The timing network 18 is employed to set the rate of rise or slope of the ramp wave form 72. For example, it has been found that a rise time of 1 millivolt per microsecond is preferable, with the ramp wave form 72 having an initial value of approximately −5 volts. Thus, with a 2 millisecond time delay introduced by the switching of the scaling amplifier 50, the initial negative value of the reference wave form 70 at the output of the scaling amplifier 50 is chosen so that it is approximately −2 volts.

The operation of the voltage to time interval converter circuit 10 with the reference and ramp wave forms having the initial conditions just described is as follows: A start pulse is generated by the synchronizing pulse generator 26 at time $T_0$ and applied to the ramp gate generator 16, see FIG. 3a. The ramp gate generator 16 is triggered to its high state of operation as shown in FIG. 3b and actuates the operation of the integrating operational amplifier 24. That is, the output of the integrating operation amplifier 24 begins to increase linearly from a value of −5 volts. When it reaches a value of a −2 volts at time $T_1$, both inputs to the corparator circuit 28 will be equal and a start pulse 68 will be generated and applied to the flip-flop 60. In turn the flip-flop 60 will open the clock gate 12 so that clock pulses pass from the clock 10 to the counter 15. Also at time $T_1$ the flip-flop 60 initiates the switching of the scaling amplifier input 51 from contact 42 to contact 38. In the preferred embodiment of the present invention this switching takes approximately 2 milliseconds. Therefore, the clock pulses are counted at the counter 15 for a 2 millisecond time interval, after which the counter 15 is reset to zero by means of the counter reset circuit 76. After the counter is reset the clock pulses are continuously supplied, without interruption, to the counter 15. This is illustrated in FIG. 3 by the effective counting time interval which begins at time $T_2$; that is, when the ramp voltage passes through the reference voltage axis $V_0$. The end of the effective counting time interval is obtained when the ramp voltage 72 coincides with the reference voltage 70 at the comparator circuit 28. When this happens the comparator 28 provides a stop pulse 74 which inhibits the clock gate 12 and resets the time interval measuring circuitry 10 as described hereinabove.

Another source of error which influences the long term stability of most semiconductor circuits is the drift or offset voltages of various instrument circuits. Elimination of the effects of voltage drift of the integrating operational amplifier 24 of the present invention is illustrated in FIG. 4. Assume that at time $T_0$ the switch 40 engages the contact 42, so that the voltage output from the scaling amplifier 50 has a negative value of $V_Z = -2$ volts. Further assume that because of voltage drift at the integrating operational amplifier 24 that the ramp voltage 72, nominally at a value of $V_R = -5$ volts, assumes a value of $V_R \pm \Delta V_R$, which at time $T_0$ is $-5 \pm \Delta V_R$ volts. As may be seen from the solid lines of FIG. 4, if the ramp voltage is precisely −5 volts, the first coincidence point determined by the comparator 28 would occur at time $T_1$. However, the effect of the error of $\pm \Delta V_R$ is to shift the first comparison point to a later, or earlier, time $T'_1$ as indicated by the dashed lines of FIG. 4. It should be noted however, that the second coincidence of the ramp voltage 72 and reference voltage 70 is correspondingly shifted; that is, it either occurs earlier or is delayed so that the time difference between the nominal coincidence times $T_1$ and $T_3$ is the same as the time difference encountered between $T'_1$ and $T'_3$. The difference in the times $T_2$ and $T'_2$, when the ramp voltage 72 crosses the $V_0$ axis for the nominal and voltage offset conditions respectively, also is unchanged. Furthermore, this time difference will be the same as that between $T_3$ and $T'_3$, the times at which the second coincidence between the outputs of the scaling amplifier 50 and the integrating operational amplifier 24 occurs. Thus, the effect of the integrating amplifier voltage drift, which otherwise would render the timing interval inaccurate, is substantially cancelled by the circuitry 10 of the present invention.

It should be apparent from FIG. 5 that a similar cancellation effect is achieved where voltage drift occurs at the scaling amplifier 50. There again the nominal operation wave forms are shown in solid lines and the voltage drift wave forms in dashed lines. At the scaling amplifier however both the reference voltage 70 and the reference voltage axis $V_0$ may change because of the voltage drift. Here again, regardless of the voltage drift, the time interval between the two voltage coincident comparisons is substantially the same as for the nominal or "no-voltage drift" operation, as indicated by the wave forms.

Since the voltages to be compared are supplied to the same comparator circuit 28, any voltage offset or drift of the comparator circuit will be self cancelling. Also simultaneous drift of both the ramp voltage generating amplifier and the scaling amplifier will be cancelled.

Obviously many modifications and variations of the present invention are possible in view of the above teachings. For example, the initial values of the ramp voltage 72 and reference voltage 70 may be chosen otherwise than as set forth in the above description. These values depend largely upon the switching time of the switch 40. Therefore, it is to be understood that the invention may be practiced otherwise than as specifically described.

We claim:
1. A solid state electronic voltage to time-interval converter circuit comprising, in combination
    means for internally generating a linear sweep voltage as a function of time,
    means for internally generating a substantially fixed reference voltage,
    means for receiving an externally generated analog voltage,
    comparator means having first and second inputs and responsive to separate signals impressed thereon to generate an output signal when said separate inputs obtain a predetermined magnitude with respect to each other, said first input being connected to said linear sweep voltage generating means,
    D.C. scaling amplifier means having an input and an output and being connected to deliver an amplified signal to said second input of said comparator means when a signal is applied to said input thereof, and
    switching means connected to said input of said D.C. amplifier and operable between first and second pole positions for selectively applying said fixed reference voltage and said analog voltage to said scaling amplifier means, together with means operatively coupled to said comparator means output and responsive to output signals therefrom for selectively switching said switching means between said first and second pole positions,
    whereby said comparator means provides spaced-apart pulses separated by a time interval corresponding to the magnitude of said analog voltage with respect to said reference voltage and such time interval is substantially unaffected by voltage drifts at said scaling amplifier means, said comparator means, and said linear sweep voltage generating means.
2. The circuitry as defined in claim 1, wherein
    said scaling amplifier means is a non-inverting operational amplifier characterized by a high input impedance and a low output impedance.
3. The circuitry as defined in claim 2, wherein
    said linear sweep voltage generating means is an integrating operational amplifier, together with actuation means connected to the input of said integrating operational amplifier to initiate the operation thereof, and threshold reset means connected to said actuator means and responsive to the output of said comparator means to reset said integrating operational amplifier after said analog signal has been compared to said sweep voltage.

4. The circuitry as defined in claim 2, wherein
said reference voltage generating means includes a stable reference diode, and
a potentiometer having a variable tap connectable to said first pole position of said switching means, whereby a chosen offset voltage may be applied to said first pole position of said switching means.

5. The circuitry as defined in claim 4, wherein
said switching means is a mechanical switch, and
said means for selectively switching said switching means includes
a flip-flop circuit having an input operatively coupled to said comparator means output and an output connected to said switch.

References Cited

UNITED STATES PATENTS

| | | | |
|---|---|---|---|
| 2,994,825 | 8/1961 | Anderson | 324—68 X |
| 3,258,764 | 6/1966 | Muniz et al. | 340—347 |
| 3,305,856 | 2/1967 | Jenkinson | 340—347 |
| 3,310,663 | 3/1967 | Bouman | 340—347 X |

MAYNARD R. WILBUR, *Primary Examiner.*

CHARLES D. MILLER, *Assistant Examiner.*

U.S. Cl. X.R.

324—68